US 8,626,832 B2

(12) United States Patent (10) Patent No.: US 8,626,832 B2
Jerrard-Dunne et al. (45) Date of Patent: Jan. 7, 2014

(54) SYSTEM AND METHOD FOR DISPLAYING A CONVERSATION SUMMARY

(75) Inventors: Stanley Kieran Jerrard-Dunne, Leopardstown (IE); David Ryant Millen, Boxford, MA (US); Michael Roche, South Dublin City (IE)

(73) Assignee: International Business Machines Corporation, Armonk, NY (US)

( * ) Notice: Subject to any disclaimer, the term of this patent is extended or adjusted under 35 U.S.C. 154(b) by 541 days.

(21) Appl. No.: 12/390,760

(22) Filed: Feb. 23, 2009

(65) Prior Publication Data

US 2009/0157709 A1 Jun. 18, 2009

(51) Int. Cl.
*G06F 15/16* (2006.01)

(52) U.S. Cl.
USPC ........... 709/204; 709/205; 370/260; 370/261; 370/265; 370/266; 715/733; 715/751

(58) Field of Classification Search
USPC .................................................. 709/204, 205
See application file for complete search history.

(56) References Cited

U.S. PATENT DOCUMENTS

| 6,346,952 | B1 | 2/2002 | Shtivelman | |
| 6,606,644 | B1 * | 8/2003 | Ford et al. | 709/203 |
| 7,383,310 | B1 | 6/2008 | Lyle et al. | |
| 7,606,909 | B1 * | 10/2009 | Ely et al. | 709/227 |
| 2002/0076025 | A1 * | 6/2002 | Liversidge et al. | 379/202.01 |
| 2006/0010217 | A1 | 1/2006 | Sood | |
| 2008/0114737 | A1 * | 5/2008 | Neely et al. | 707/3 |
| 2009/0077062 | A1 * | 3/2009 | Spivack et al. | 707/5 |
| 2009/0094189 | A1 * | 4/2009 | Stephens | 707/2 |

OTHER PUBLICATIONS

IBM, "System & Method of Contextual Thread Association in a Dynamic Display Environment", 1 page, (Mar. 24, 2008).
IBM, "Dynamic Rule-based Management of IM Sessions", 2 pages, (Nov. 1, 2006).
IBM, "Method to Provide History to Instant Message Members Invited to Join a Conference After the Session Has Started", 1 page, Jul. 17, 2006.
Constantin's Blooog (Wed Oct. 10, 2007) "CEC 2007: JavaFX on stage, podcasting with Jonathan and Web 2.0 at the unconference", http://blogs.sun.com/constantin/entry/cec_2007javafx_on_stage.

* cited by examiner

*Primary Examiner* — Jude Jean Gilles
*Assistant Examiner* — Jaren M Means
(74) *Attorney, Agent, or Firm* — Holland & Knight LLP; Brian J. Colandreo, Esq.; Jeffrey T. Placker, Esq.

(57) ABSTRACT

A system, method and computer program product for displaying a conversation summary is provided. The method may include providing a graphical user interface (GUI) configured to allow communication between a number of users. The method may also include displaying an invitation to join a conversation at the graphical user interface from at least one of the users and displaying a summary of the conversation in a tag cloud on a computing device. Numerous other variations and embodiments are also included within the scope of the present disclosure.

20 Claims, 4 Drawing Sheets

US 8,626,832 B2

SYSTEM AND METHOD FOR DISPLAYING A CONVERSATION SUMMARY

TECHNICAL FIELD

This disclosure relates to a method for displaying a conversation summary, and more particularly, to a system, method and computer program product for displaying a conversation summary using a tag cloud.

BACKGROUND

Instant messaging is a very popular form of communication in today's internet driven world. As such, numerous people may be invited to participate in an ongoing instant message chat session. However, it may be difficult for the invitee to gain a full understanding of the context of the conversation without reading the preceding messages or without the people already in the chat providing a summary. As expected, the invitee may not want to join a meeting where the subject is not of particular interest.

Similarly, in virtual worlds an avatar may enter a space where an ongoing conversation is occurring that was previously out of range of the avatar. In order for the avatar to get the gist of the conversation he/she must wait and catch up with the ongoing conversation.

Known solutions such as persistent chat may require that the person read back over the conversation in order to get the gist of what is being discussed, which may be time consuming and distracting from the ongoing conversation. Other known solutions such as highlighting keywords in the persistent chat may suffer from similar difficulties in that the person must look back over the entire chat to determine what is being discussed.

SUMMARY OF DISCLOSURE

In a first implementation, a computer-implemented method in accordance with the present disclosure may include providing a graphical user interface (GUI) configured to allow communication between a plurality of users. The method may further include displaying an invitation to join a conversation at the graphical user interface from at least one of the plurality of users and displaying a summary of the conversation in a tag cloud on a computing device.

One or more of the following features may be included. The computer-implemented method may also include dynamically updating the summary during the conversation. The conversation may be an instant messaging conversation.

In some implementations the method may also include storing a record of the words used in the conversation. The method may additionally include determining a weighting for each of the words based upon at least one of a count and a time stamp and displaying at least one of the words based upon the weighting.

In some implementations the summary may be generated using a text analysis engine.

In some implementations the graphical user interface may be associated with a virtual world environment or an IP telephony application.

In a second implementation, a computer program product residing on a computer readable medium that may have a plurality of instructions stored on it is provided. When executed by a processor, the instructions may cause the processor to perform operations including providing a graphical user interface (GUI) configured to allow communication between a plurality of users. The computer program product may further include instructions for displaying an invitation to join a conversation at the graphical user interface from at least one of the plurality of users and displaying a summary of the conversation in a tag cloud on a computing device.

One or more of the following features may be included. The computer program product may further include instructions for dynamically updating the summary during the conversation. The conversation may be an instant messaging conversation.

In some implementations the computer program product may further include instructions for storing a record of the words used in the conversation. The computer program product may further include instructions for determining a weighting for each of the words based upon at least one of a count and a time stamp and displaying at least one of the words based upon the weighting.

In some implementations the summary may be generated using a text analysis engine.

In some implementations the graphical user interface may be associated with a virtual world environment or an IP telephony application.

In a third implementation a computing system is provided. The computing system may include a processor and a memory architecture coupled with the processor. The computing system may also include a first software module executed on the processor and the memory architecture, wherein the first software module is configured to provide a graphical user interface (GUI) configured to allow communication between a plurality of users.

The computing system may include a second software module configured to display an invitation to join a conversation at the graphical user interface from at least one of the plurality of users.

The computing system may further include a third software module configured to display a summary of the conversation in a tag cloud on a computing device. In some embodiments, the conversation may be an instant messaging conversation.

The details of one or more implementations are set forth in the accompanying drawings and the description below. Other features and advantages will become apparent from the description, the drawings, and the claims.

DETAILED DESCRIPTION OF THE PREFERRED EMBODIMENTS

System Overview

Figure 1:
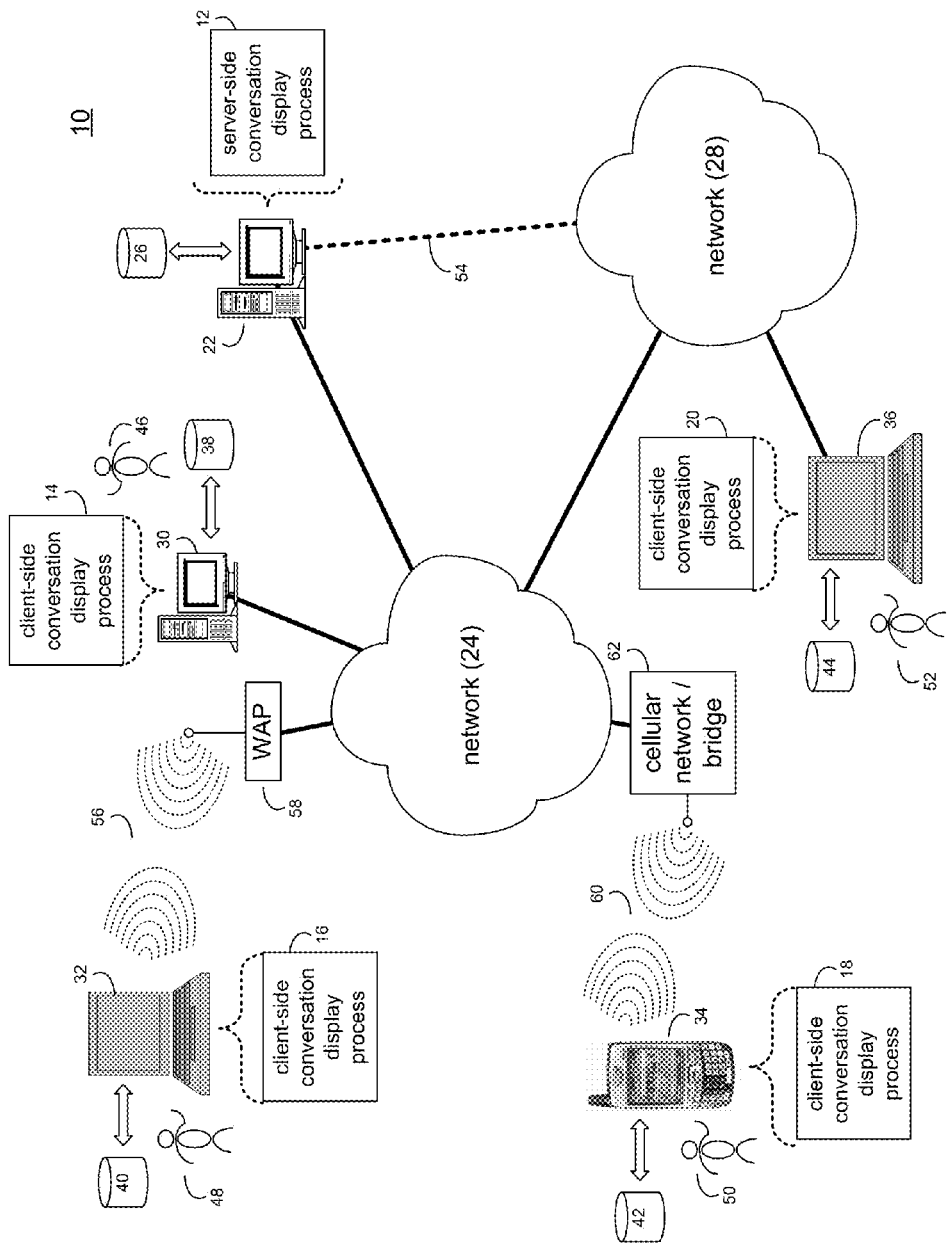
FIG. 1 is a diagrammatic view of a conversation display process coupled to a distributed computing network.

Referring to FIG. 1, there is shown conversation display process 10 that may reside on and may be executed by server computer 12, which may be connected to network 24 (e.g., the Internet or a local area network). Examples of server computer 12 may include, but are not limited to: a personal computer, a server computer, a series of server computers, a mini computer, and a mainframe computer. Server computer 12 may be a web server (or a series of servers) running a network operating system, examples of which may include but are not limited to: Microsoft Windows XP Server™; Novell Netware™; or Redhat Linux™, for example.

As will be discussed below in greater detail, conversation display process 10 may be configured to provide a graphical user interface (GUI) to allow communication between a plurality of users. Conversation display process 10 may further include displaying an invitation to join a conversation at the graphical user interface from at least one of the plurality of users. Conversation display process 10 may also include displaying a summary of the conversation in a tag cloud on a computing device. The summary may be displayed in conjunction with the invitation to allow a user to determine whether or not to join the conversation.

Conversation display process 10 may be a server-side process (e.g., server-side conversation display process 12), a client-side process (e.g., client-side conversation display process 14, client-side conversation display process 16, client-side conversation display process 18, or client-side conversation display process 20), or a hybrid server-side/client-side process (e.g., the combination of server-side conversation display process 12 and one or more of client-side conversation display processes 14, 16, 18, 20). Accordingly and for the following disclosure, conversation display process 10 shall collectively refer to any and all combinations of server-side conversation display process 12 and/or client-side conversation display processes 14, 16, 18, 20.

Server-side conversation display process 12 may reside on and may be executed by server computer 22, which may be connected to network 24 (e.g., the Internet or a local area network). Examples of server computer 22 may include, but are not limited to: a personal computer, a server computer, a series of server computers, a mini computer, and a mainframe computer. Server computer 22 may be a web server (or a series of servers) running a network operating system, examples of which may include but are not limited to: Microsoft Windows XP Server™; Novell Netware™; or Redhat Linux™, for example.

The instruction sets and subroutines of server-side conversation display process 12, which may be stored on storage device 26 coupled to server computer 22, may be executed by one or more processors (not shown) and one or more memory architectures (not shown) incorporated into server computer 22. Storage device 26 may include but is not limited to: a hard disk drive; a tape drive; an optical drive; a RAID array; a random access memory (RAM); and a read-only memory (ROM).

Server computer 22 may execute a web server application, examples of which may include but are not limited to: Microsoft IIS™, Novell Webserver™, or Apache Webserver™, that allows for access to server computer 22 (via network 24) using one or more protocols, examples of which may include but are not limited to HTTP (i.e., HyperText Transfer Protocol), SIP (i.e., session initiation protocol), and the Lotus Sametime™ VP protocol. Network 24 may be connected to one or more secondary networks (e.g., network 28), examples of which may include but are not limited to: a local area network; a wide area network; or an intranet, for example.

Client-side conversation display processes 14, 16, 18, 20 may reside on and may be executed by client electronic devices 30, 32, 34, 36 (respectively), examples of which may include but are not limited to personal computer 30, laptop computer 32, personal digital assistant 34, notebook computer 36, a data-enabled, cellular telephone (not shown), and a dedicated network device (not shown), for example. Client electronic devices 30, 32, 34, 36 may each be coupled to network 24 and/or network 28 and may each execute an operating system, examples of which may include but are not limited to Microsoft Windows™, Microsoft Windows CE™, Redhat Linux™, or a custom operating system.

The instruction sets and subroutines of client-side conversation display processes 14, 16, 18, 20, which may be stored on storage devices 38, 40, 42, 44 (respectively) coupled to client electronic devices 30, 32, 34, 36 (respectively), may be executed by one or more processors (not shown) and one or more memory architectures (not shown) incorporated into client electronic devices 30, 32, 34, 36 (respectively). Storage devices 38, 40, 42, 44 may include but are not limited to: hard disk drives; tape drives; optical drives; RAID arrays; random access memories (RAM); read-only memories (ROM); compact flash (CF) storage devices; secure digital (SD) storage devices; and memory stick storage devices.

Examples of client-side conversation display processes 14, 16, 18, 20 may include, but are not limited to, a process incorporated into and executed within a client-side instant messaging application (e.g., Microsoft IM™ and Lotus Sametime™), which may allow for instant-message based communication between a plurality of users (e.g., users 48, 50). Examples of server-side conversation display process 12 may include a process incorporated into and executed within a server-side instant messaging application (e.g., Microsoft IM Server™ and Lotus Sametime Server™). Alternatively, client-side conversation display processes 14, 16, 18, 20 and/or server-side conversation display process 12 may be stand-alone applications that work in conjunction with (i.e., interface with) a client-side instant messaging application and/or a server-side instant messaging application (respectively). One or more of client-side conversation display processes 14, 16, 18, 20 and server-side conversation display process 12 may interface with each other (via network 24 and/or network 28) to allow a plurality of users (e.g., users 48, 50) to transmit instant messages to each other.

Users 46, 48, 50, 52 may access server-side conversation display process 12 directly through the device on which the client-side conversation display process (e.g., client-side conversation display processes 14, 16, 18, 20) is executed, namely client electronic devices 30, 32, 34, 36, for example. Users 46, 48, 50, 52 may access server-side conversation display process 12 directly through network 24 and/or through secondary network 28. Further, server computer 22 (i.e., the computer that executes server-side conversation display process 12) may be connected to network 24 through secondary network 28, as illustrated with phantom link line 54.

The various client electronic devices may be directly or indirectly coupled to network 24 (or network 28). For example, personal computer 30 is shown directly coupled to network 24 via a hardwired network connection. Further, notebook computer 36 is shown directly coupled to network 28 via a hardwired network connection. Laptop computer 32 is shown wirelessly coupled to network 24 via wireless communication channel 56 established between laptop computer 32 and wireless access point (i.e., WAP) 58, which is shown directly coupled to network 24. WAP 58 may be, for example, an IEEE 802.11a, 802.11b, 802.11g, Wi-Fi, and/or Bluetooth device that is capable of establishing wireless communication channel 56 between laptop computer 32 and WAP 58. Personal digital assistant 34 is shown wirelessly coupled to network 24 via wireless communication channel 60 established between personal digital assistant 34 and cellular network/bridge 62, which is shown directly coupled to network 24.

As is known in the art, all of the IEEE 802.11x specifications may use Ethernet protocol and carrier sense multiple access with collision avoidance (i.e., CSMA/CA) for path sharing. The various 802.11x specifications may use phase-shift keying (i.e., PSK) modulation or complementary code keying (i.e., CCK) modulation, for example. As is known in the art, Bluetooth is a telecommunications industry specification that allows e.g., mobile phones, computers, and personal digital assistants to be interconnected using a short-range wireless connection.

The Conversation Display Process:

For the following discussion, conversation display process 10 shall be described generically and shall collectively refer to any and all combinations of server-side conversation display process 12 and/or client-side conversation display processes 14, 16, 18, 20. For illustrative purposes, assume that client-side conversation display processes 14, 16, 18, 20 are processes incorporated into and executed within a client-side instant messaging application (e.g., Microsoft IM™, Lotus Sametime™, Google Talk™) that allow for communication with server-side conversation display process 12. However, this is not intended to be a limitation of this disclosure, as other configurations are possible (e.g., stand-alone, client-side conversation display processes and/or stand-alone server-side conversation display processes.

Assume for illustrative purposes that users 46, 48, 50, 52 are all coworkers and that they each use an instant messaging system (e.g., Microsoft IM™ and Lotus Sametime™) to communicate. These examples are provided merely for exemplary purposes, as any suitable messaging system may be used in conjunction with conversation display process 10.

Figure 2:
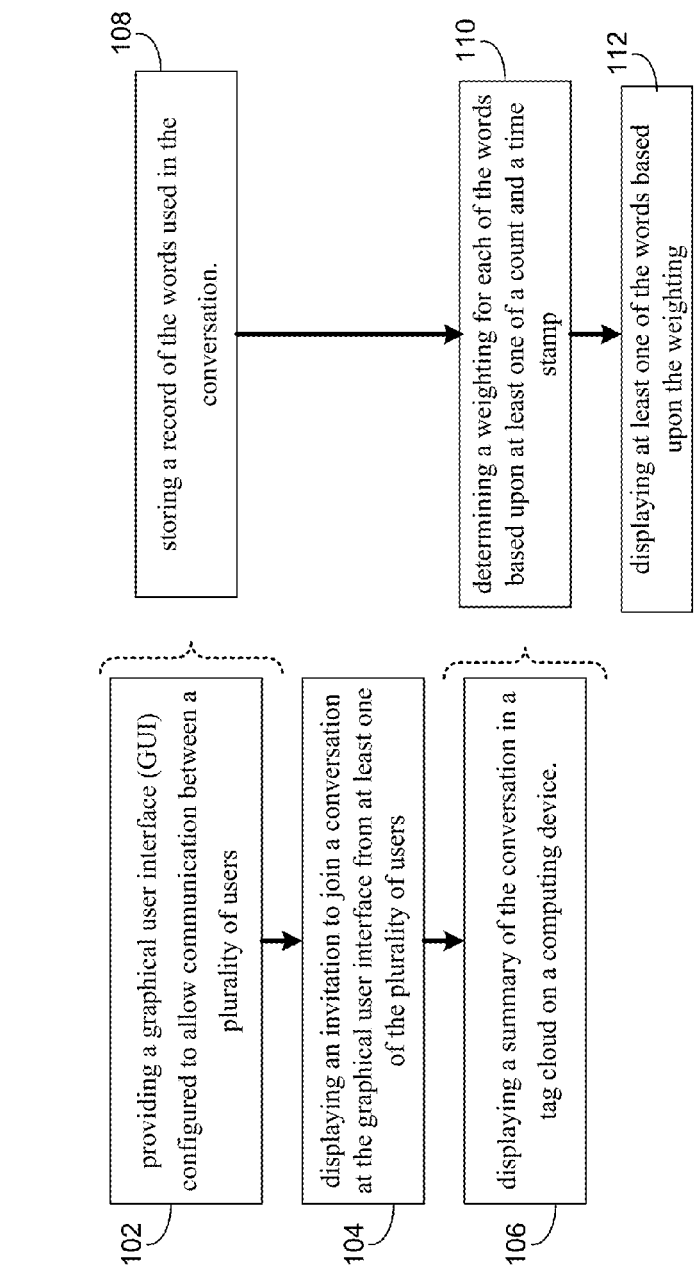
FIG. 2 is a flowchart of the conversation display process of FIG. 1.

Referring now to FIG. 2, one exemplary embodiment depicting operations of conversation display process 10 is shown. In some embodiments, conversation display process 10 may include providing a graphical user interface (GUI) configured to allow communication between a plurality of users (e.g., users 46, 48, 50, 52, etc) (102). Conversation display process 10 may further include displaying an invitation to join a conversation at the graphical user interface from at least one of the plurality of users (104). The invitation may include displaying a summary of the conversation in a tag cloud on a computing device (e.g., notebook computer 36) (106).

Thus, the present disclosure may provide a mechanism to give a potential conversation participant a quick summary of the ongoing and/or prior conversation via a summarization displayed as a "tag cloud." The summary may be provided with the invitation before the person decides to join the chat and may also dynamically update as the chat proceeds. The term "tag cloud" as used herein may refer to a display of text. In some cases this display may take the form of a weighted summary, which is discussed in further detail below.

Figure 3:
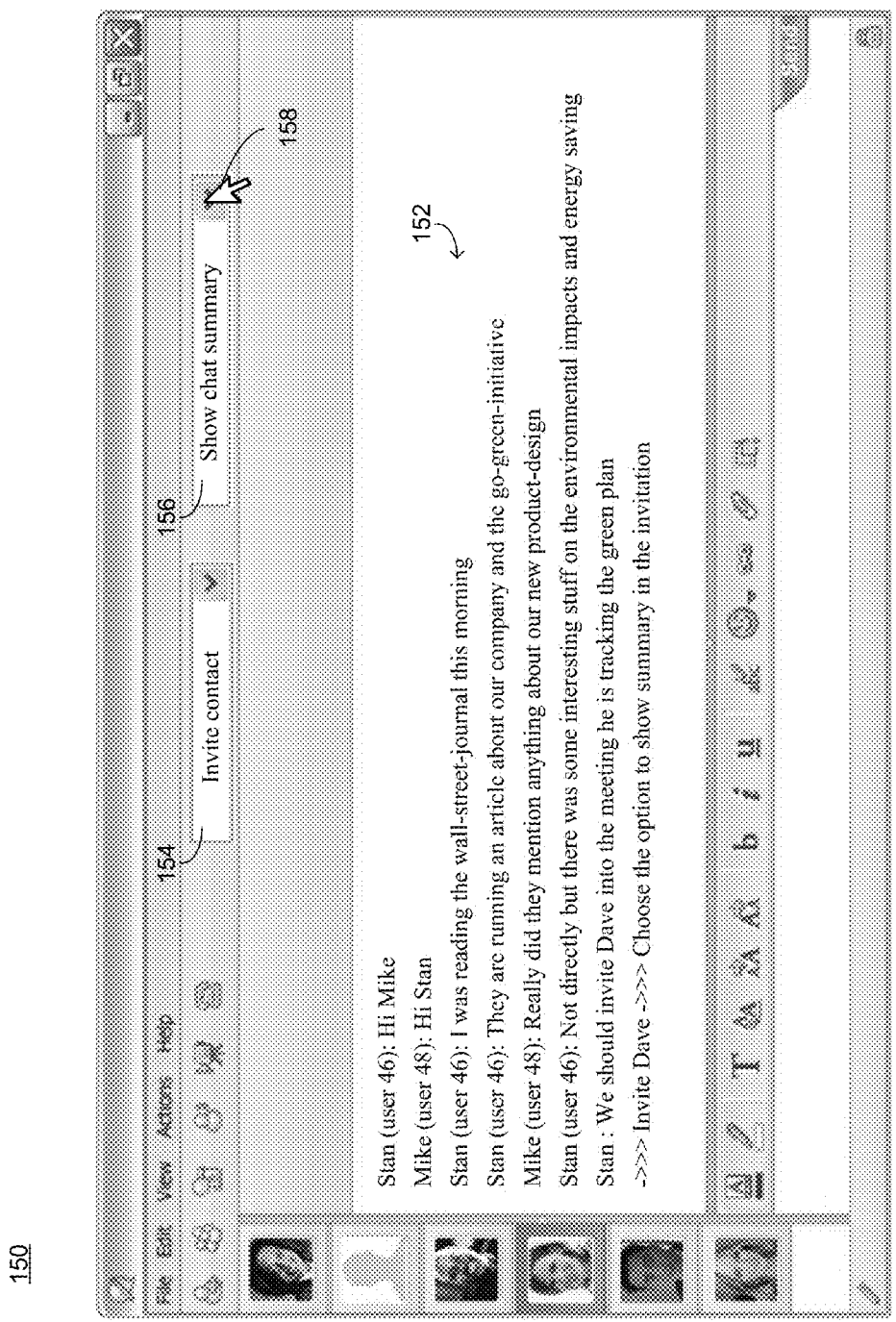
FIG. 3 is a diagrammatic view of a display screen rendered by a client device of FIG. 1.
Figure 4:
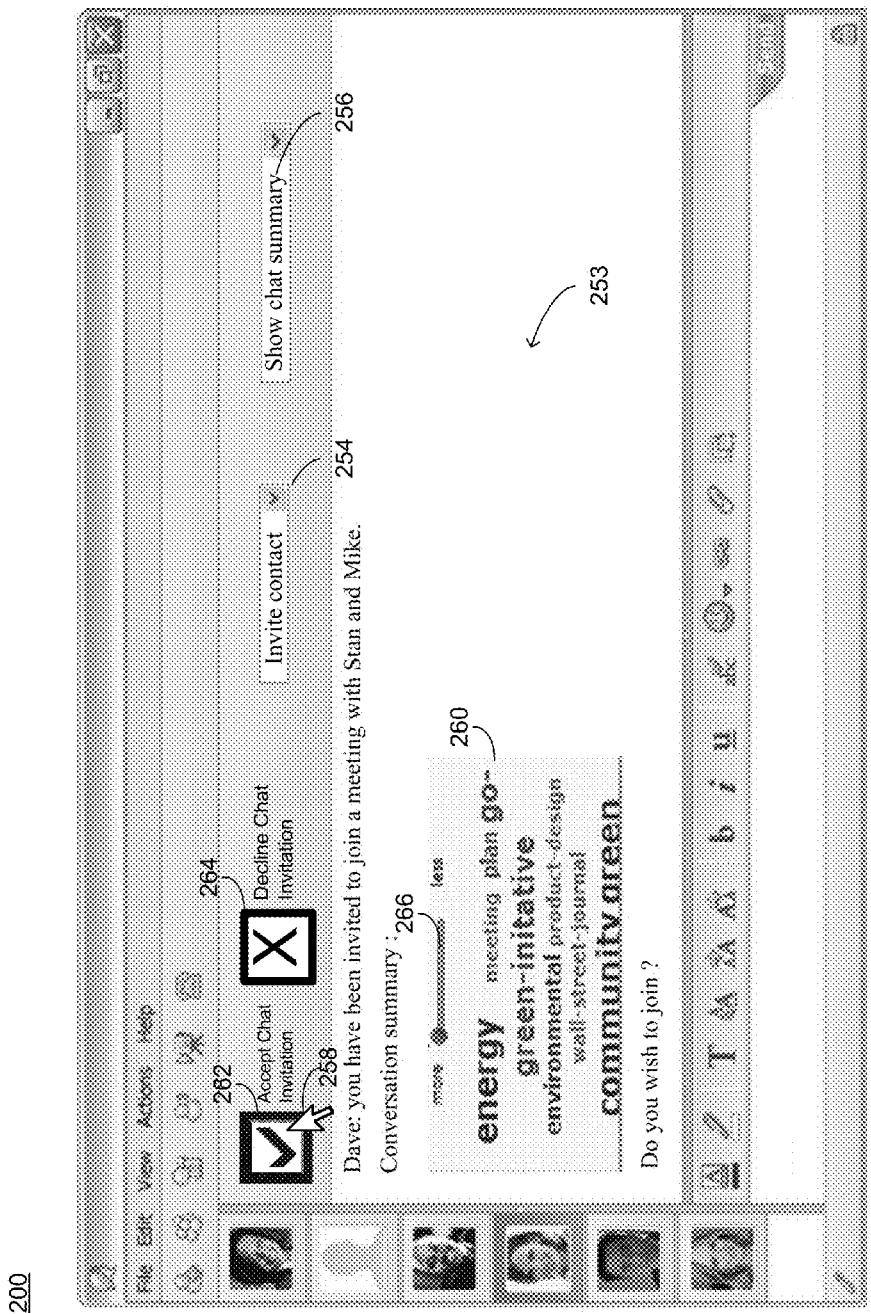
FIG. 4 is a diagrammatic view of a display screen associated with the conversation display process of FIG. 1.

Referring now to FIGS. 3-4, a particularly illustrative embodiment of conversation display process 10 is provided. FIG. 3 shows an example of a graphical user interface in the form of an instant messaging display window 150 configured for use with conversation display process 10. In this particular example, a conversation 152 may be occurring between two users over network 24, for example, user 46 (Stan) and user 48 (Mike) as shown in FIG. 1. Here, Stan & Mike may be having an instant message chat about an initiative taking place within their company.

Display window 150 may include a number of features and selection tools. For example, display window 150 may include an invitation selection tool 154, which may allow for one user (e.g. user 46 and/or 48) to invite another user (e.g. 52) to join the conversation 152. Here, user 46 (i.e., Stan) may wish to send an invitation to chat to Dave (i.e., user 52). In operation, user 46 may utilize chat summary tool 156 shown in display window 150. In this example, user 46 (i.e. Stan) may use pointer 158 to select that he wishes to include a chat summary with the invitation. Chat summary tool 156, if selected, may be configured to provide a chat summary to the recipient (i.e. user52/Dave) of the invitation.

While invitation selection tool 154 and chat summary tool 156 are depicted as drop-down menus accessible via pointer 158, this disclosure is not intended to be limited to such implementations. As such, numerous other examples may include, but are not limited to, buttons, right-click activation, keystroke combinations, toolbar options, etc. In some embodiments, invitation selection tool 154 and chat summary tool 156 may be combined and/or accessible through a single selection tool. Moreover, this particular example describes a conversation between two users who may desire to add a third user. However, it should be noted that this disclosure is not limited such an implementation as the concepts described herein may be applied to any number and/or combination of users.

Referring now to FIG. 4, conversation display process 10 is shown in display window 200. Display window 200 may be utilized by the recipient of the invitation, for example, user 52 (i.e. Dave). Display window 200 may provide user 52 with the invitation 253 from user 46 (i.e. Stan). Display window 200 may further include invitation selection tool 254 and chat summary tool 256 as discussed above.

Invitation 253 may include conversation summary 260, which may take the form of a tag cloud or other display. User 52 may now view conversation summary 260 and determine whether or not to join the conversation. User 52 may choose to accept the invitation by selecting accept chat invitation box 262 using pointer 258. Alternatively, user 52 may decline the invitation by selecting decline chat invitation box 264. Conversation summary 260 may provide the recipient of the invitation with a nearly instant context of what has been and/or is being discussed.

In some embodiments, boxes 262 and 262 may be configured to automatically appear in display window 200 of the receiver of the invitation when a sender (e.g., user 46) has sent the invitation. However, it should be noted that the accept and decline features need not take the form of a selectable box. Numerous other options are also within the scope of the present disclosure. For example, the option to accept or decline the invitation may appear anywhere within and/or outside of display window 200.

Similarly, although conversation summary 260 is depicted within the body of invitation 253, conversation summary 260 may be located in any suitable location within and/or outside of display screen 200. In some embodiments, user 52 may activate conversation summary 260 by selecting from chat summary tool 256. In this way, chat summary tool 256 may allow for both the sender and receiver to select the show chat summary feature.

In some embodiments, conversation summary 260 may be a live dynamically updating summary of the ongoing conversation. The sender of invitation 253, here user 46 (i.e., Stan), may decide to allow the entire conversation between he and user 48 (i.e. Mike) to be forwarded to user 52 (i.e., Dave), or alternatively, only selected portions. In this way, conversation summary 260 may include the complete previous conversation or may pick-up from where one of the users joined. For example, in some situations a user may be invited without revealing portions of the previous conversation via the invite.

As discussed above, conversation summary 260 may take the form of a tag cloud. The tag cloud may be user-configurable and may include a number of different options. In some embodiments, the tag cloud may include a precision selector 266, which may be configured to identify the most commonly used terms in the conversation. Precision selector 266 may allow a user to select the precision with which he/she wishes to view conversation summary 260. For example, common keywords in the conversation may be displayed in large font or in bold, underlined, etc. The number of keywords displayed may depend upon where precision selector 266 is set between the options of "more" or "less." This gives the user the option of choosing how many words he/she wishes to display within conversation summary 260. In some embodiments, as the keywords age they may eventually fade out of conversation summary 260. The example shown in FIG. 4 clearly shows the terms "energy", "environmental", "green-initiative", "community", etc.

In some embodiments, as the conversation proceeds a record of the words used in the conversation may be stored (108). Once used, each word in the conversation may be time stamped to provide a record of when it was last used. Moreover, conversation display process 10 may be configured to maintain a count indicative of the usage of the word. Conversation display process 10 may also be configured to ignore punctuation and common filler words such as "the", "if", "then", "are", "an", etc. Any or all of these options may be user-configurable and, therefore, set to a particular user's preferences.

Either individually or in combination, the count and the time stamp may be used to generate conversation summary 260 (e.g. tag cloud). In this way, conversation display process 10 may further include determining a weighting for each of the words based upon the count and the time stamp (110). The weighting for each word may be determined using a variety of different factors, including but not limited to, the word's count, the word's recent usage, etc. The words may then be shown in the tag cloud according to this determined weight.

In some embodiments, configuration settings may be used to limit the size of the summarization record. Thus, the older record of used words may drop off of the list as the summarization record exceeds a predefined limit. As discussed above, this limit may be set by the user. This feature may help to ensure that the summary reflects the current context of the conversation.

In some embodiments, conversation summary 260 may be generated using a text analysis engine that may incorporate natural language processing (NLP) technology. Some text analysis engines may include, but are not limited to, IBM® LanguageWare®, Natural Language Toolkit, etc. The text analysis engine may be used to provide a summarization of the text of the conversation. This summarization may be used as the basis to produce the record of the words as well as conversation summary 260. Natural language processors may provide advantage such as in the grouping of similar words to provide a more concise summary. For example, in a conversation with the words geese and goose, a summarization may choose to group these as a single word "Geese". This may minimize excessive duplication of words in conversations summary 260.

In some embodiments, conversation display process 10 may be associated with a virtual world environment (e.g. Second Life®). In this example, an object may be placed somewhere in the virtual space, for example in a meeting room, theatre, etc. The object may be within range of conversations within that space and may record the ongoing chat. This recorded conversation may be displayed on a panel in the manner described above, i.e., as a conversation summary tag cloud, which may dynamically update as the conversation proceeds. A person upon entering the space may then see the conversation summary or tag cloud and obtain a summary of the ongoing conversation.

In some embodiments, conversation display process 10 may be associated with a Voice over Internet Protocol (VOIP) or IP telephony application. In an IP telephony environment, voice to text technology may be used to produce a conversation summary, which may be provided to invitees to the voice chat. Of course, numerous other embodiments and applications are also within the scope of the present disclosure.

Some of the embodiments described above may be implemented as software modules executed by a processor of a computing system, and/or in a computer program product that may be stored on a storage medium having instructions that when executed by a processor perform the messaging process described herein. The storage medium may include any type of disk including floppy disks, optical disks, compact disk read-only memories (CD-ROMs), compact disk rewritables (CD-RWs), and magneto-optical disks, semiconductor devices such as read-only memories (ROMs), random access memories (RAMs) such as dynamic and static RAMs, erasable programmable read-only memories (EPROMs), electrically erasable programmable read-only memories (EEPROMs), flash memories. Other embodiments may be implemented as software modules executed by a programmable control device.

A number of implementations have been described. Nevertheless, it will be understood that various modifications may be made. Accordingly, other implementations are within the scope of the following claims.

What is claimed is:

1. A computer-implemented method comprising:
providing a graphical user interface (GUI) configured to allow communication between a plurality of users;
displaying an invitation to join a conversation at the graphical user interface from at least one of the plurality of users, wherein the conversation is active between two or more of the plurality of users and the invitation to join the conversation at the graphical user interface from the at least one of the plurality of users is to a third party; and
displaying, with the invitation to join the conversation at the graphical user interface from the at least one of the plurality of users to the third party, a summary of the conversation in a tag cloud on a computing device, the summary of the conversation in the tag cloud viewable, with the invitation, to the third party, wherein the summary is dynamically updated in the tag cloud via a precision selector during the conversation as the conversation proceeds.

2. The computer-implemented method of claim 1 wherein the conversation is an instant messaging conversation.

3. The computer-implemented method of claim 1 further comprising storing a record of the words used in the conversation.

4. The computer-implemented method of claim 3 further comprising determining a weighting for each of the words based upon at least one of a count and a time stamp.

5. The computer-implemented method of claim 4 further comprising displaying at least one of the words based upon the weighting.

6. The computer-implemented method of claim 1 wherein the summary is generated using a text analysis engine.

7. The computer-implemented method of claim 1 wherein the graphical user interface is associated with at least one of: a virtual world environment, and an IP telephony application.

8. A computer program product residing on a computer readable medium having a plurality of instructions stored thereon which, when executed by a processor, cause the processor to perform operations comprising:

providing a graphical user interface (GUI) configured to allow communication between a plurality of users;

displaying an invitation to join a conversation at the graphical user interface from at least one of the plurality of users, wherein the conversation is active between two or more of the plurality of users and the invitation to join the conversation at the graphical user interface from the at least one of the plurality of users is to a third party; and displaying, with the invitation to join the conversation at the graphical user interface from the at least one of the plurality of users to the third party, a summary of the conversation in a tag cloud on a computing device, the summary of the conversation in the tag cloud viewable, with the invitation, to the third party, wherein the summary is dynamically updated in the tag cloud via a precision selector during the conversation as the conversation proceeds.

9. The computer program product of claim 8 wherein the conversation is an instant messaging conversation.

10. The computer program product of claim 8 further comprising storing a record of the words used in the conversation.

11. The computer program product of claim 10 further comprising determining a weighting for each of the words based upon at least one of a count and a time stamp.

12. The computer program product of claim 11 further comprising displaying at least one of the words based upon the weighting.

13. The computer program product of claim 8 wherein the summary is generated using a text analysis engine.

14. The computer program product of claim 8 wherein the graphical user interface is associated with at least one of: a virtual world environment, and an IP telephony application.

15. A computing system comprising:
at least one processor;
at least one memory architecture coupled with the at least one processor;
a first software module executed on the at least one processor and the at least one memory architecture, wherein the first software module is configured to provide a graphical user interface (GUI) configured to allow communication between a plurality of users;
a second software module executed on the at least one processor and the at least one memory architecture, wherein the second software module is configured to display an invitation to join a conversation at the graphical user interface from at least one of the plurality of users, wherein the conversation is active between two or more of the plurality of users and the invitation to join the conversation at the graphical user interface from the at least one of the plurality of users is to a third party; and
a third software module executed on the at least one processor and the at least one memory architecture, wherein the third software module is configured to display, with the invitation to join the conversation at the graphical user interface from the at least one of the plurality of users to the third party, a summary of the conversation in a tag cloud on a computing device, the summary of the conversation in the tag cloud viewable, with the invitation, to the third party, wherein the summary is dynamically updated in the tag cloud via a precision selector during the conversation as the conversation proceeds.

16. The computing system of claim 15 wherein the conversation is an instant messaging conversation.

17. The computer-implemented method of claim 1 wherein the invitation includes the summary of the conversation and the tag cloud.

18. The computer program product of claim 8 wherein the invitation includes the summary of the conversation and the tag cloud.

19. The computer-implemented method of claim 1 wherein the tag cloud displayed with the invitation enables the third party to determine whether or not to join the conversation.

20. The computer program product of claim 8 wherein the tag cloud displayed with the invitation enables the third party to determine whether or not to join the conversation.

\* \* \* \* \*